United States Patent
Asher

(10) Patent No.: US 10,785,308 B2
(45) Date of Patent: Sep. 22, 2020

(54) VEHICLE DEVICE OPERATING PARAMETER SETTING SYSTEM

(71) Applicant: Nissan North America, Inc., Franklin, TN (US)

(72) Inventor: Simon Asher, Winsor (CA)

(73) Assignee: Nissan North America, Inc., Franklin, TN (US)

( * ) Notice: Subject to any disclaimer, the term of this patent is extended or adjusted under 35 U.S.C. 154(b) by 146 days.

(21) Appl. No.: 15/852,636

(22) Filed: Dec. 22, 2017

(65) Prior Publication Data
US 2019/0199799 A1   Jun. 27, 2019

(51) Int. Cl.
| | |
|---|---|
| H04L 29/08 | (2006.01) |
| G06F 16/435 | (2019.01) |
| G06F 3/0482 | (2013.01) |
| B60R 16/037 | (2006.01) |
| G07C 9/00 | (2020.01) |
| H04L 29/06 | (2006.01) |

(52) U.S. Cl.
CPC .......... *H04L 67/125* (2013.01); *B60R 16/037* (2013.01); *G06F 3/0482* (2013.01); *G06F 16/437* (2019.01); *G07C 2009/00507* (2013.01); *G07C 2009/00769* (2013.01); *G07C 2009/00888* (2013.01); *H04L 63/0853* (2013.01)

(58) Field of Classification Search
CPC .......... B60T 7/12; B60T 13/745; B60T 8/171; B60T 8/3255; B60T 7/22; B60T 13/662; B60T 2201/12; B60T 8/4872; B60T 2201/10
See application file for complete search history.

(56) References Cited

U.S. PATENT DOCUMENTS

| | | | |
|---|---|---|---|
| 4,805,427 A | 2/1989 | Bates et al. | |
| 9,573,566 B2 | 2/2017 | Oesterliing | |
| 2008/0195564 A1* | 8/2008 | Kojima | B60H 1/00735 706/12 |
| 2008/0309454 A1* | 12/2008 | Tsuji | B60R 25/2081 340/5.6 |

(Continued)

OTHER PUBLICATIONS

Unpublished U.S. Appl. No. 15/224,378, filed Jul. 29, 2016, entitled Smart Tutorial That Learns and Adapts.

*Primary Examiner* — Hussein Elchanti
(74) *Attorney, Agent, or Firm* — Global IP Counselors, LLP

(57) ABSTRACT

A vehicle device operating parameter setting system includes a controller connected to at least one vehicle device. The controller is configured to count repetitions of usage of the at least one vehicle device by a first vehicle operator using parameters that differ from the previously saved parameter settings and determine whether the repetitions of the usage of the vehicle device by the first vehicle operator exceed a predetermined number. In response to the repetitions exceeding the predetermined number, the controller automatically operates an information providing device providing the first vehicle operator with a plurality of parameter settings of the at least one vehicle device. The controller is further configured to save a selected one of the plurality of parameter settings in response to the first vehicle operator selecting the one of the plurality of parameter settings, thereby replacing the previously saved parameter setting.

20 Claims, 11 Drawing Sheets

(56) References Cited

U.S. PATENT DOCUMENTS

| | | | |
|---|---|---|---|
| 2015/0197205 A1* | 7/2015 | Xiong | B60R 16/037 |
| | | | 701/49 |
| 2016/0304052 A1 | 10/2016 | Naitou | |
| 2017/0120867 A1* | 5/2017 | Beauvais | B60R 25/24 |
| 2018/0170256 A1* | 6/2018 | Medenica | B60Q 9/00 |
| 2018/0208208 A1* | 7/2018 | Chen | B60W 40/09 |
| 2018/0215345 A1* | 8/2018 | Elangovan | B60R 25/01 |
| 2018/0223564 A1* | 8/2018 | Roberts, III | E05B 17/2007 |

* cited by examiner

VEHICLE DEVICE OPERATING PARAMETER SETTING SYSTEM

BACKGROUND

Field of the Invention

The present invention generally relates to a vehicle device operating parameter setting system. More specifically, the present invention relates to a vehicle device operating parameter setting system that automatically provides a vehicle operator with a selection of operating parameters for operating a vehicle device after the vehicle operator repeatedly manually changes the parameter setting thereby allowing the vehicle operator to save the manually changed parameter settings for future use.

Background Information

Many vehicles have vehicle devices that operate using saved parameter settings. For example, door locks that unlock a vehicle in response to a button on a door handle or a button on a keyfob can be pressed once to unlock only a driver's door, and pressed twice to unlock all vehicle doors. Parameter settings of such a vehicle device can be changed and saved for future use by a vehicle operator. For example, the parameter settings can be changed and saved such that a single pressing of the button on the door handle or keyfob opens all doors. Another example of a vehicle device is an adjustable seat that can be positioned and re-positioned manually, but can also be re-positioned to previously saved parameter settings. However, some vehicle operators are unaware of the vehicle's capabilities with regard to changing parameter settings of a vehicle device or do not know how to save parameter settings for future use.

SUMMARY

One object of the present disclosure is to provide a vehicle operator with information regarding default or saved parameter settings for a vehicle device such that the vehicle operator can customize the parameter settings for the vehicle device and save the customized parameter settings.

In view of the state of the known technology, one aspect of the present disclosure is to provide a vehicle device operating parameter setting system with a vehicle device, a sensor, an information providing device, an input device and a controller. The vehicle device is installed to a vehicle and is operable with any one of a plurality of parameter settings. The vehicle device is initially set to operate with a previously saved parameter setting of the plurality of parameter settings. The sensor is configured to detect operation of the vehicle device by a first vehicle operator. The information providing device is configured to provide information about the plurality of parameter settings of the vehicle device to the first vehicle operator. The input device is configured to receive input in response to selections by the first vehicle operator based upon the information provided by the information providing device. The controller is connected to the vehicle device, the sensor, the information providing device and the input device. The controller is configured to count repetitions of usage of the vehicle device by the first vehicle operator using parameters that differ from the previously saved parameter settings and determine whether the repetitions of the usage of the vehicle device by the first vehicle operator exceed a predetermined number, and in response to the repetitions of the usage of the vehicle device by the first vehicle operator exceeding the predetermined number, the controller automatically operates the information providing device providing the first vehicle operator with the plurality of parameter settings of the vehicle device. The controller is further configured to save a selected one of the plurality of parameter settings in response to the first vehicle operator selecting the one of the plurality of parameter settings, thereby replacing the previously saved parameter setting.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
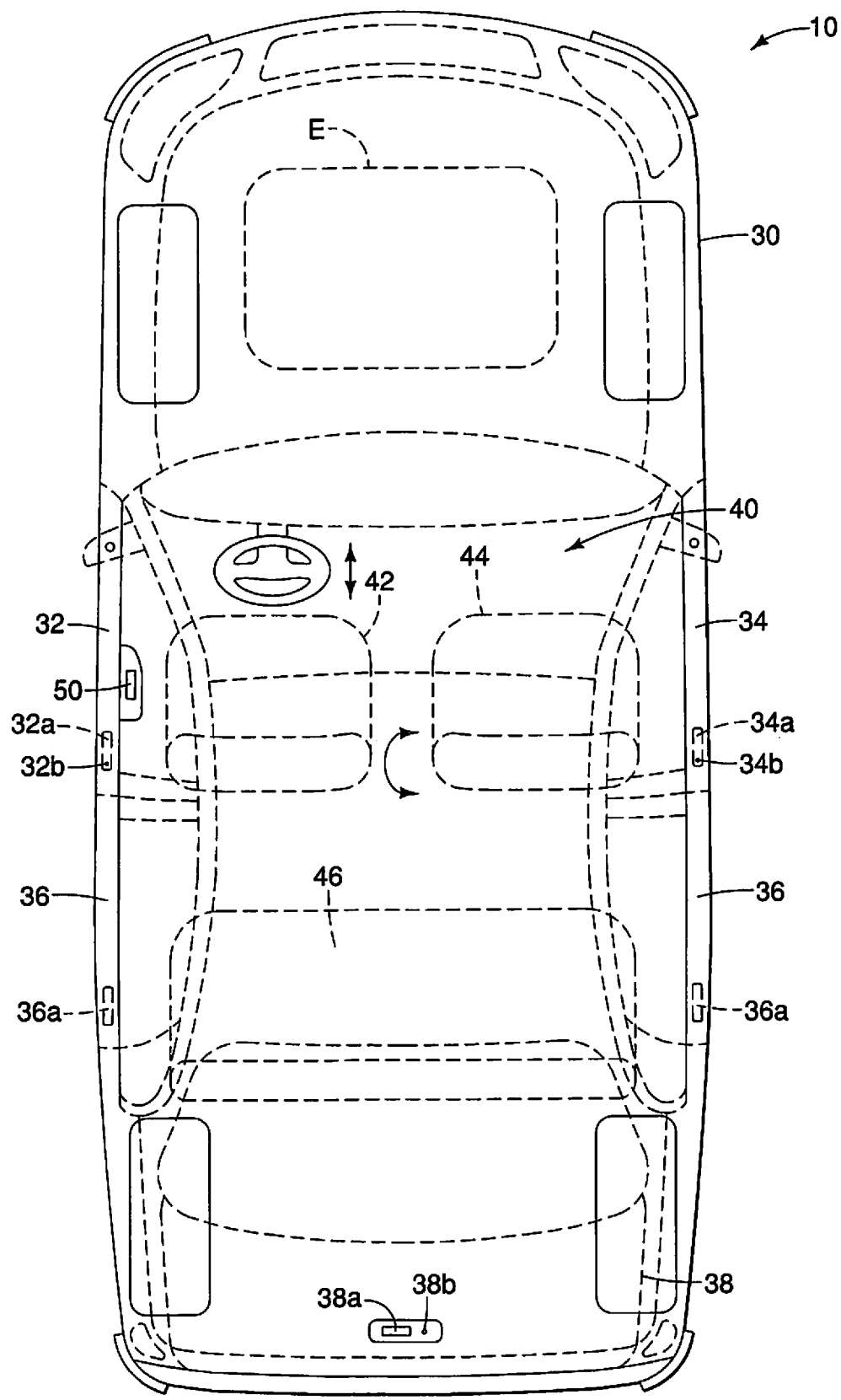
FIG. 1 is a schematic top view of a vehicle showing various features of the vehicle including a vehicle device operating parameter setting system that has a plurality of vehicle devices including a door lock system and an adjustable driver's seat, in accordance with one embodiment.
Figure 2:
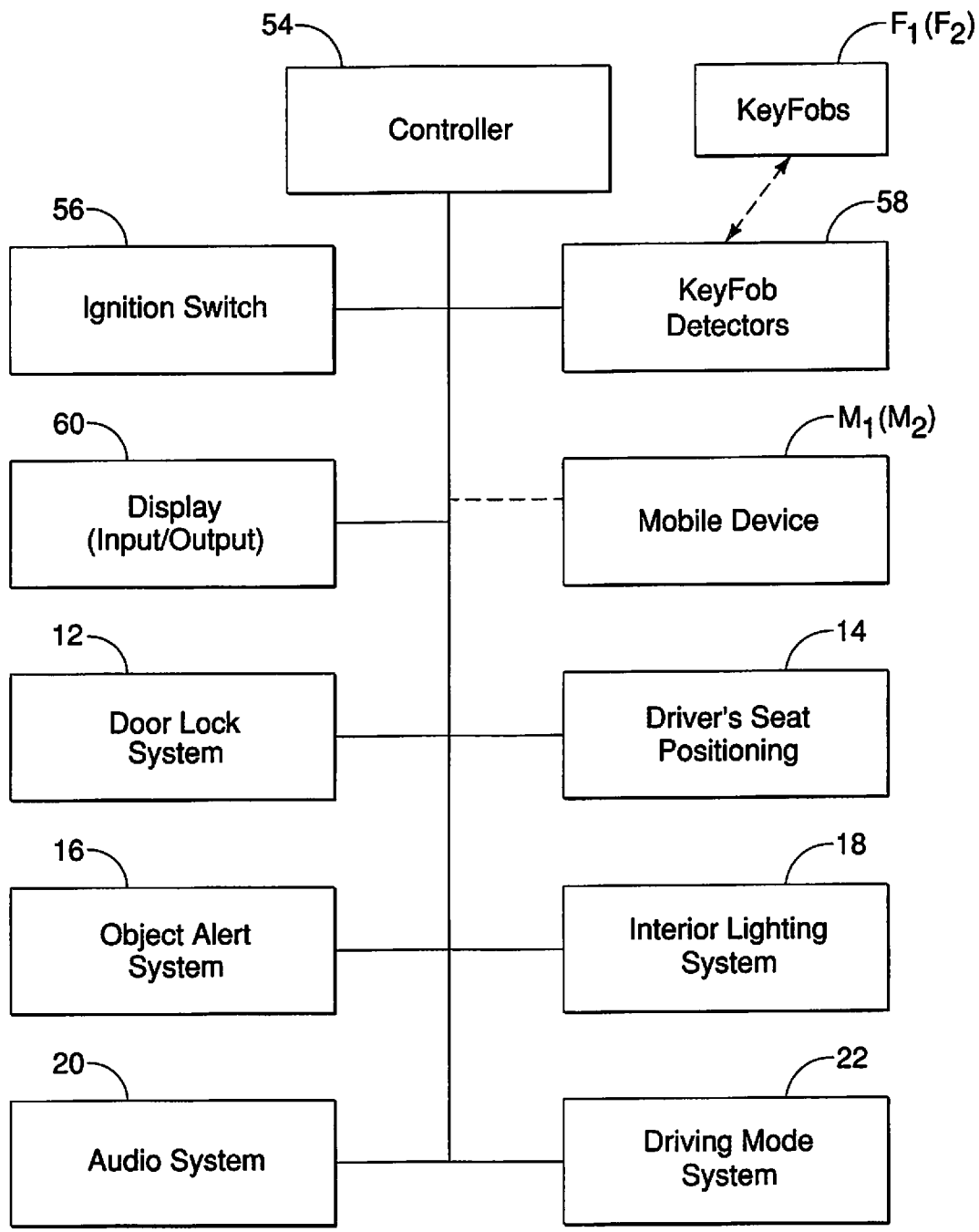
FIG. 2 is a block diagram schematically showing basic portions of the vehicle device operating parameter setting system including the door lock system, the adjustable driver's seat, an object alert system, an interior lighting system, an audio system and a driving mode system in accordance with the one embodiment.

Referring initially to FIG. 1, a vehicle 10 is illustrated in accordance with a first embodiment. As shown in FIG. 2, the vehicle 10 includes a plurality of differing vehicle devices (also referred to as vehicle systems), such as a door lock system 12, a seat positioning system 14, an object alert system 16, an interior lighting system 18, an audio system 20 and a vehicle driving mode system 22, that are described in greater detail below.

With reference again to FIG. 1, the vehicle 10 also includes a vehicle body structure 30. The vehicle body structure 30 includes a driver's door 32, a front passenger's door 34, rear doors 36 and a rear hatch door 38 (that can alternatively be truck lid on a sedan or coupe vehicle).

The driver's door 32 includes a door handle 32a with a door lock switch 32b. The vehicle body structure 30 further includes a driver's door sensor 32c that detects whether or not the driver's door 32 is open or closed. The door handle 32a can be a mechanical device that operates a latch mechanism (not shown) within the driver's door 32 that is operated to open the driver's door 32 and when the driver's door 32 is closed, retains the driver's door 32 in the closed position in a conventional manner. As is described in greater detail below, the door lock switch 32b is part of the door lock system 12 and is operated to lock and unlock a driver's door lock 32d of the driver's door 32 and, in certain circumstances, unlock all doors of the vehicle 10, including the rear hatch door 38.

Similarly, the front passenger's door 34 includes a door handle 34a with a door lock switch 34b. The vehicle body structure 30 further includes a passenger's door sensor 34c that detects whether or not the passenger's door 34 is open or closed. The door lock switch 34b is connected to a passenger's door lock 34d that is locked and unlocked via operation of the driver's door lock 32d and/or the passenger's door lock 34d. The rear doors 36 also include door handles 36a. The vehicle body structure 30 further includes rear door sensors 36c that detects whether or not each the rear doors 36 is open or closed. Although not shown, the door handles 36a can optionally include door lock switches, but such door lock switches in the door handles 36a are not required for understanding the operation of the door lock system 12. Each of the rear doors 36 further includes rear door locks 36d that are locked an unlocked via operation of one or the other of the door lock switches 32b and 34b.

Further, the rear hatch door 38 can include a door latch operating button 38a and a door lock switch 38b. The vehicle body structure 30 further includes a rear hatch door sensor 38c that detects whether or not the driver's door 32 is open or closed. The rear hatch door 38 further includes a rear hatch door lock 38d that is locked and unlocked via operation of any one of the door lock switches 32b, 34b and 38b.

The door latch operating button 38a can be part of a mechanical device that operates a door latch mechanism (not shown) that opens and closes the rear hatch door 38, or can be electrically connected to an electro-mechanical device (not shown) that opens and closes the rear hatch door 38. The door lock switch 38b is part of the door lock system 12, as is described in greater detail below.

The vehicle body structure 30 defines a passenger compartment 40 that is accessed via any of the doors 34, 36 and 38. The passenger compartment 40 includes a driver's seat 42, a passenger's seat 44 and a rear seat 46. The driver's seat 42 includes a control panel 50 that can be installed to the driver's door 32 or to a center console (not shown) or on an instrument panel (not shown) within the passenger compartment 40. The control panel 50 includes controls for operating seat positioning motors such as a vertical motor 42a, a forward/rearward motor 42b and a seatback angle motor 42c. Specifically, the vertical motor 42a is operated via the control panel 50 to vertically position the driver's seat 32. The forward/rearward motor 42b is operated via the control panel 50 to move the driver's seat 32 in forward and rearward directions. The seatback angle motor 42c is operated via the control panel 50 to adjust an angle of inclination of the seatback portion of the driver's seat 32.

The driver's seat 42 can include optional position sensors 52 (FIG. 4) that are installed within the driver's seat 32 and are configured to provide positioning information or can be integrated into each of the motors 42a, 42b and 42c in order to provide an indication of position and orientation of the various adjustable sections of the driver's seat 42.

As shown in FIG. 2, the vehicle 10 further includes a controller 54, an ignition switch 56, a keyfob detector 58 with associated keyfobs $F_1$ and $F_2$, a display that can include, for example, a touch screen or push button system thereby defining a display input/output 60 and a communication system (not shown) that communicates with selected mobile devices $M_1$ and $M_2$. It should be understood from the description herein and the drawings that the display input/output 60 and the mobile devices $M_1$ and $M_2$ are an information providing devices used by the controller 54. Further, it should be understood from the description herein and the drawings that the display input/output 60 and the mobile devices $M_1$ and $M_2$ are also input devices used by the controller 54.

The controller 54 is electrically connected to the ignition switch 56, the keyfob detector 58 (that detects and communicates with keyfobs $F_1$ and $F_2$), the display input/output 60 and a communication system (not shown) that communicates with selected mobile devices $M_1$ and $M_2$, the door lock system 12, the seat positioning system 14, the object alert system 16, the interior lighting system 18, the audio system 20 and the vehicle driving mode system 22. The controller 54 is part of, or alternatively, is a body control module (BCM). Further the controller 54 can include an engine control module (ECM) or can be connected to a separate ECM, depending upon the overall design of the vehicle 10.

The keyfob detectors 58 include a conventional sensor array that detect the presence of one of the keyfobs $F_1$ and $F_2$. Once one of the keyfobs $F_1$ and $F_2$ has been detected, the controller 54 initially enables operation of the door lock system 12, awaiting signals from one of the keyfobs $F_1$ and $F_2$ to open the driver's door or all the doors, and also enables the door lock system 12 to respond to pressing of one of the door lock switches 32b, 34b and/or 38b. Additionally, the keyfob detectors 58 can optionally be configured to identify proximity of one of the mobile devices $M_1$ and $M_2$, and similarly enable operation of the door lock system 12. Since keyfob detectors 58 are conventional devices, further description is omitted for the sake of brevity.

The controller 54 is an electronic device that preferably includes a microcomputer with a plurality of control programs, one for each of the vehicle devices described here, as discussed below. The controller 54 can also include other conventional components such as an input interface circuit, an output interface circuit, and storage devices such as a ROM (Read Only Memory) device and a RAM (Random Access Memory) device. The microcomputer of the controller 54 is programmed to monitor and control each of the vehicle devices separately, or in combination with one another. The memory circuit stores processing results and control programs such as ones for the various vehicle devices, including the door lock system 12, the driver's seat positioning system 14, the object alert system 16, the interior lighting system 18, the audio system 20 and the driving mode system 22.

The controller 54 is operatively coupled to each of the above vehicle devices in a conventional manner. The internal RAM of the controller 54 stores statuses of operational flags and various control data. The internal ROM of the controller 54 stores data, default information and data for various operations related to each of the vehicle devices. It will be apparent to those skilled in the art from this disclosure that the precise structure and algorithms for the controller 54 can be any combination of hardware and software that will carry out the functions of the present invention.

Prior to describing the operations of the controller 54, a brief description of each of the vehicle devices is provided with specific reference to FIGS. 3-8.

Figure 3:
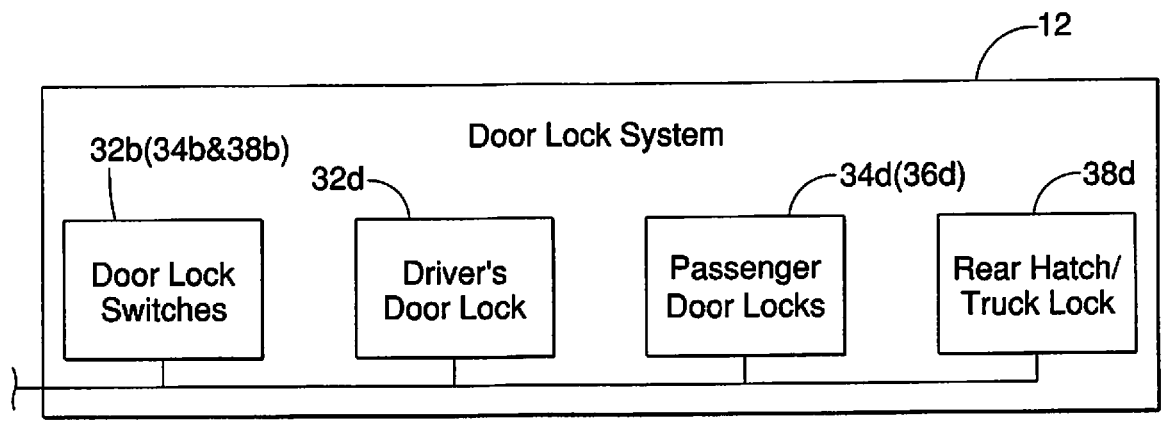
FIG. 3 is a block diagram showing basic features of the door lock system in accordance with the one embodiment.

As shown in FIG. 3, the door lock system 12 includes at least the following: the door lock switches 32b (34b and 38b); a driver's door lock 32d; a passenger's door lock 34d and rear door locks 36d; and a rear hatch door lock 38d. The door lock system 12 further makes use of the keyfob detectors 58. Specifically, once one of the keyfobs $F_1$ or $F_2$ is within a predetermined distance from the vehicle, the buttons (not shown) one the keyfobs $F_1$ and $F_2$ can be pressed to unlock the driver's door 32 and optionally unlock all of the doors 32, 34, 36 and 38. Default settings (default parameter settings) for the door lock system 12 can include instructions that include unlocking only the driver's door 32 when the unlock button on one of the keyfobs $F_1$ or $F_2$ is pressed once; and unlocking all of the vehicle doors and the rear hatch door 38 when the unlock button on one of the keyfobs $F_1$ or $F_2$ is pressed twice. The default settings (default parameter settings) also include instructions wherein only the driver's door 32 is unlocked when the door lock switch 32b on the driver's door 32 is pressed once; and when the door lock switch 32b on the driver's door 32 is pressed twice, all of the vehicle doors and the rear hatch door 38 are unlocked.

The controller 54 is further configured such that default settings of the door lock system 12 can be changed and saved in memory via input from the display input/output 60 or from a linked mobile device $M_1$ or $M_2$ (for example, cell phones or tablet devices). Various options can be programmed into the controller 54 as parameter settings, such as reversing the instructions, such that pressing once causes all doors to unlock, and pressing twice causes only the driver's door 32 to open. Further, the controller 54 can have customizing settings where pressing one causes one door other than the driver's door 32 to open. Such a parameter setting would be advantageous if the vehicle operator always puts an object in the rear seat area of the vehicle 10 prior to entering the vehicle 10.

Figure 4:
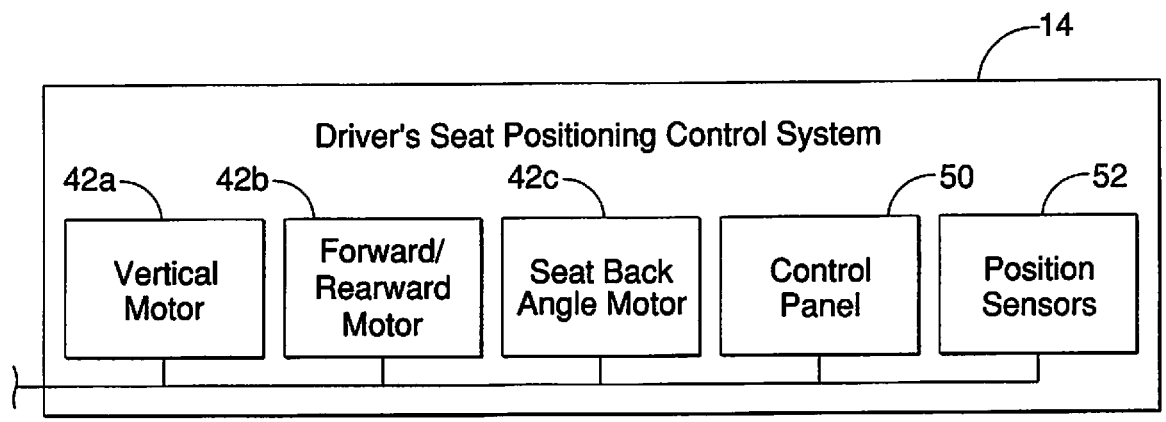
FIG. 4 is a block diagram showing basic features of the adjustable driver's seat in accordance with the one embodiment.

As shown in FIG. 4, the seat positioning system 14 includes the control panel 50, optional position sensors 52, the vertical motor 42a, the forward/rearward positioning motor 42b and the seat back angle adjusting motor 42c for the driver's seat 42. The controller 54 includes memory that stores default positions of the adjustable portions of the driver's seat 42. The controller 54 is further configured to store customized settings (parameters) for any of a plurality of vehicle operators, includes separate settings associated with each of the keyfobs $F_1$ and $F_2$. Since the controller 54 is provided with feedback either from the position sensors 52 or the motors 42a, 42b and 42c, the controller 54 stores information relating to position adjustments made by each identifiable vehicle operator, as is explained in greater detail below.

Figure 5:
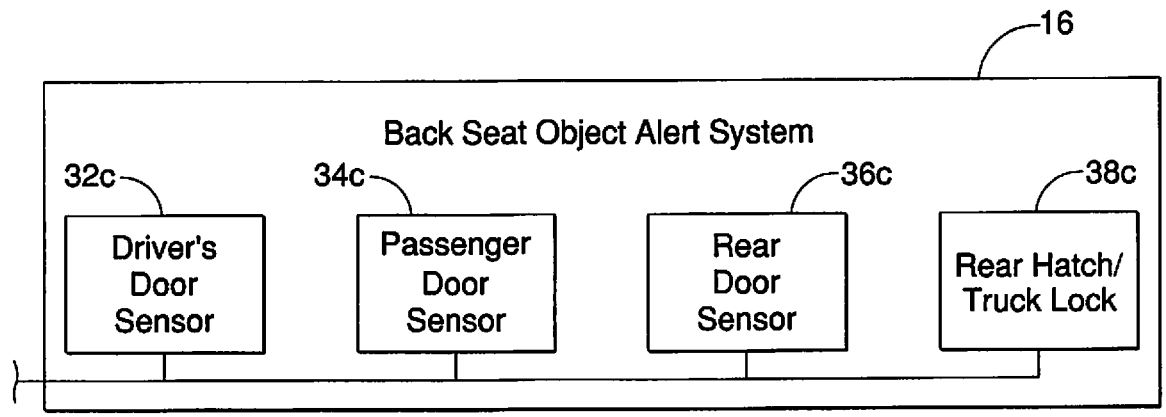
FIG. 5 is a block diagram showing basic features of the object alert system in accordance with the one embodiment.

As shown in FIG. 5, the object alert system 16 includes the driver's door sensor 32c, the passenger's door sensor 34c, the rear door sensors 36c and the rear hatch door sensor 38c. Saved parameters associated with the object alert system 16 include, for example, turning the object alert system 16 off and on, as needed. The controller 54 monitors the sequence of the opening and closing of each of the doors and rear hatch of the vehicle 10 in order to determine whether or not the vehicle operator has left an object (or child) in the rear of the vehicle 10. The operations of the backseat object alert system 16 are described in, for example, U.S. Pat. No. 9,734,695, issued Aug. 15, 2017, and/or U.S. application Ser. No. 15/333,865, filed Oct. 25, 2016. Both U.S. Pat. No. 9,734,695 and U.S. application Ser. No. 15/333,865 are incorporated herein in their entirety.

Figure 6:
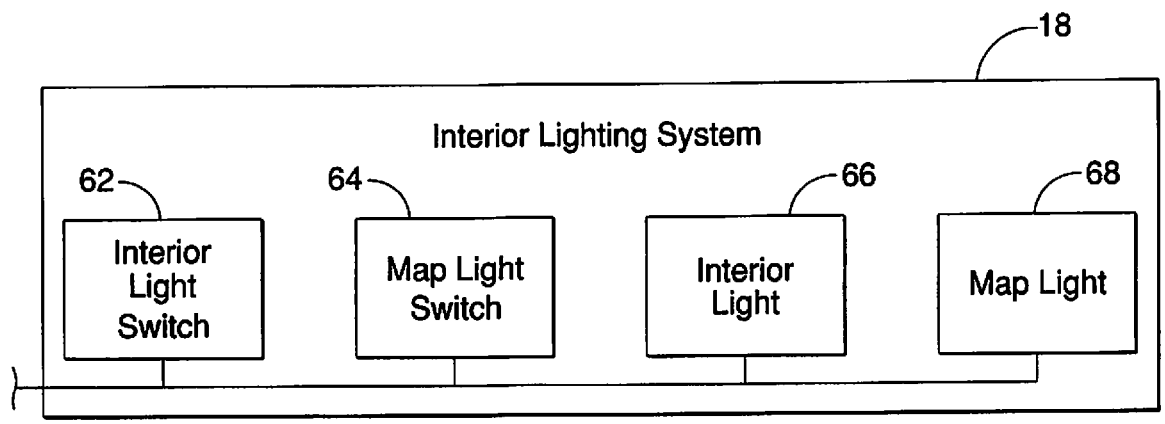
FIG. 6 is a block diagram showing basic features of the interior lighting system in accordance with the one embodiment.

As shown in FIG. 6, the interior lighting system 18 includes, for example, an interior light switch 62, a map light switch 64, interior lights 66 and a map light 68. The interior light switch 62 and the map light switch 64 can be located at any of a variety of locations within the passenger compartment 40, such as a center console, on the roof structure (headliner), the instrument panel, or on the driver's door 32. The interior lights 66 and the map light 68 can be located throughout the passenger compartment 40 along the headliner, the pillar structures, instrument panel or center console. Saved parameters of the interior lighting system 18 include setting duration of time that the lights stay on before, or after operation of the vehicle 10, and/or setting duration of time the lights stay on after a door opens and closes.

Figure 7:
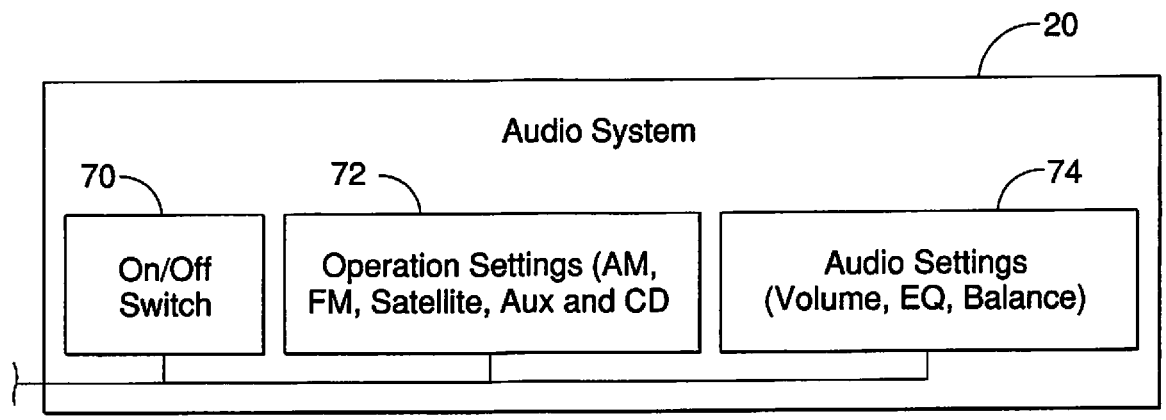
FIG. 7 is a block diagram showing basic features of the audio system in accordance with the one embodiment.

As shown in FIG. 7, the audio system 20 includes an on/off switch 70, operation settings 72 and audio settings 74. The operation settings 72 include selecting and setting audio sources, such as AM radio, FM radio, satellite radio, CD or DVD player, and/or an auxiliary input that can include, for example, a USB connector and/or wireless communication device that connects to a media player or other audio source. The audio settings 74 include selection and setting of audio output such as volume settings and/or EQ settings. Parameter settings for the audio system 20 can include saving specific settings such as audio source selection and audio output settings.

Figure 8:
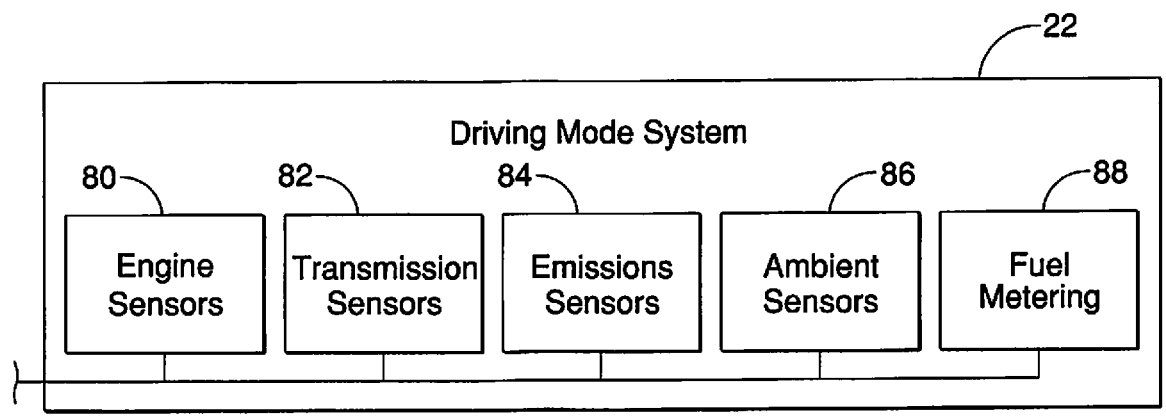
FIG. 8 is a block diagram showing basic features of the driving mode system in accordance with the one embodiment.

As shown in FIG. 8, the vehicle driving mode system 22 includes engine sensors 80 that are installed to an engine E (FIG. 1), transmission sensors 82 installed to a vehicle transmission (represented in FIG. 1 as being part of the engine E) connected to the engine E, emission sensors 84 attached to an exhaust system (not shown) of the engine E, ambient sensors 86 that monitor ambient air temperature, ambient air pressure and ambient humidity conditions around the vehicle 10, and a fuel metering system 88 of the engine E. The controller 54 is configured to operate the engine E and transmission in a plurality of differing driving modes that can be selected by a vehicle operator. For example, the controller 54 can operate the engine E in at least: 1) an economy mode where fuel efficiency is maintained during driving operations of the vehicle 10; 2) a performance mode where maximum engine power is available during driving operations; and 3) a normal mode where the controller 54 balances operation of the engine E to provide a balance between fuel efficiency and performance driving experiences. Parameter settings of the driving mode system 22 include selection and saving of the selection of the preferred mode of operation for a specific vehicle operator. It should be understood from the drawings and the description herein that the engine E, the sensors 80 and the sensors 82 can be connected to the ECM (which is connected to the controller 54), or can be directly connected to the controller 54, where the controller 54 also serves as the ECM.

Each of the above described vehicle devices, the door lock system 12, the seat positioning system 14, the object alert system 16, the interior lighting system 18, the audio system 20 and the vehicle driving mode system 22, is configured to operate with any one of a plurality of parameter settings. Each of these vehicle devices is initially set to operate with a previously saved parameter setting of their plurality of parameter settings, that are default settings. Once a vehicle operator has saved parameter settings for a particular vehicle device, that saved parameter setting is thereafter implemented by the controller 54 for that particular vehicle device. If there are several vehicle operators, each vehicle operator is able to save his or her own parameter settings. In the depicted embodiment, a vehicle operator is associated with a dedicated one of the keyfobs $F_1$ and $F_2$. For example, when the controller 54 identifies the keyfob $F_1$ as being present for operation of the vehicle 10 and the vehicle devices, the controller 54 recalls from memory the saved parameter settings identified and associated with the keyfob $F_1$. Similarly, when the controller 54 identifies the keyfob $F_2$ as being present for operation of the vehicle 10 and the vehicle devices, the controller 54 recalls from memory the saved parameter settings identified and associated with the keyfob $F_2$. It should be understood from the drawings and the description herein that identification of a vehicle operator via identification of one of the keyfobs is merely one example of a configuration that identifies a vehicle operator. For example, the controller 54 can also be set to identify a vehicle operator based upon a mobile device, such as a cell phone or tablet device, carried by the vehicle operator. In this configuration, the controller 54 associates saved vehicle device parameter settings with the mobile device carried by the vehicle operator. Further, the controller 54 can be configured to identify a vehicle operator based on identification of both a keyfob and identification of a mobile device carried by the vehicle operator.

Figure 9:
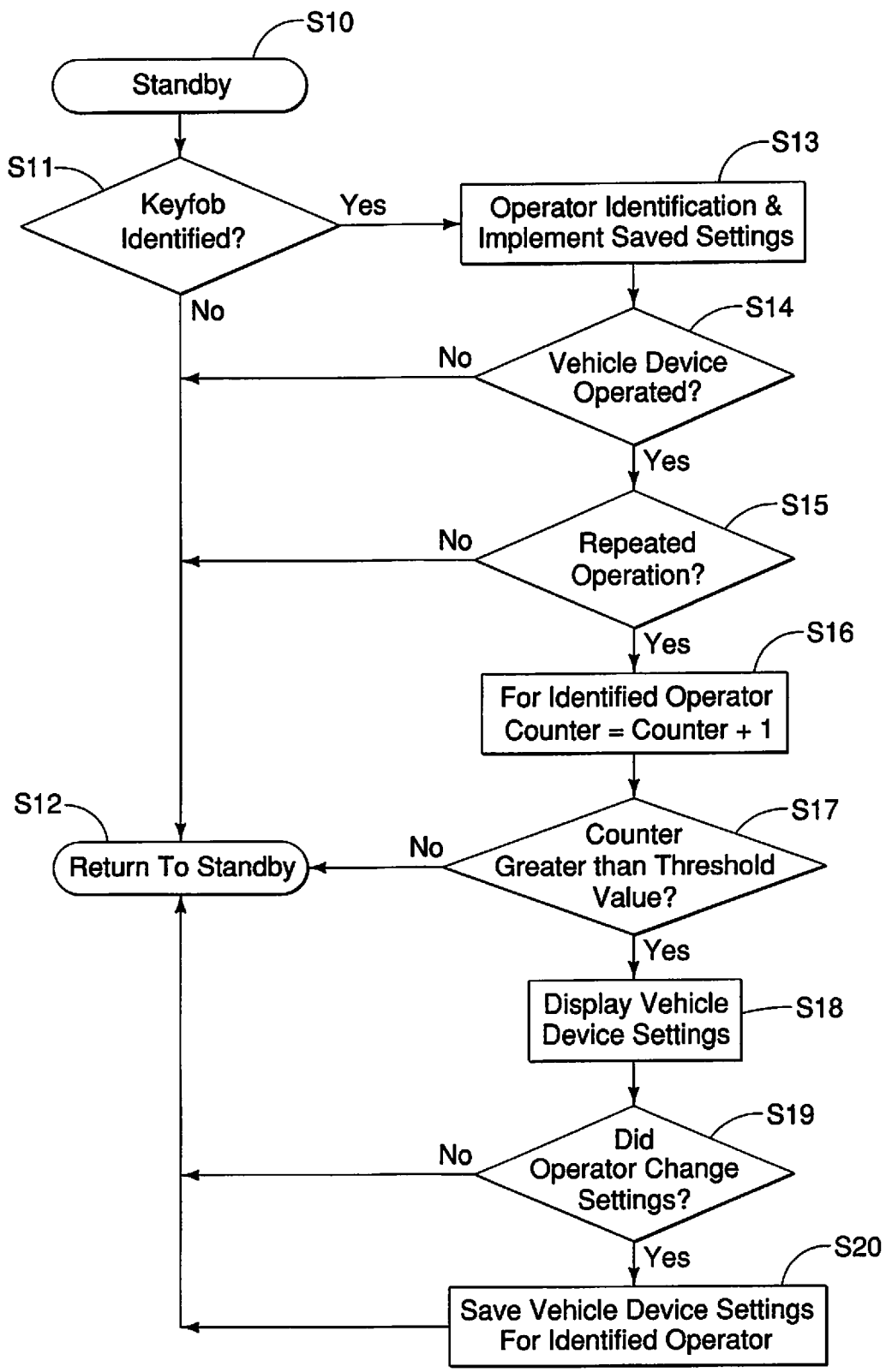
FIG. 9 is a flowchart generically showing basic steps conducted by the vehicle device operating parameter setting system for automatically providing a vehicle operator with information that assists the vehicle operator with the process for changing the parameter settings for any one or all of a plurality of vehicle devices and then saving the changes to the parameter settings for future use in accordance with the one embodiment.

A generic description of operations conducted by the controller 54 is now provided with reference to the steps depicted in the flowchart of FIG. 9. Step S10 is a standby mode wherein the controller 54 is monitoring the various sensors of the vehicle 10 and in particular, the keyfob detectors 58. At step S11, the controller 54 determines whether or not one of the keyfobs $F_1$ and $F_2$ is close to the vehicle 10. If not, operation returns to the standby mode, as represented at step S12. If yes, operation moves to step S13. At step S13, the controller 54 identifies the vehicle operator and recalls from memory the various saved parameter settings associated with the identified vehicle operator for each of the vehicle devices installed in the vehicle 10.

Next at step S14, the controller 54 determines whether one or more of the vehicle devices has been operated. If not, operation returns to step S12 (and to step S10). If so, then operation moves to step S15 where the controller 54 determines whether or not the use of the vehicle device is a repeated operation that has been implemented by the identified vehicle operator. Herein, the term repeated operation indicates that the vehicle operator has repeated an operation that differs from the saved parameter setting for that vehicle device, indicating that the vehicle operator either does not want to take advantage of and use the saved parameter settings, or the vehicle operator is unaware that the parameter settings for that vehicle device can be altered and re-saved.

At step S15, if no, then operation returns to step S12 (and to step S10). If yes, then operation moves to step S16 where the controller 54 increases an operator counter for the used vehicle device. Next, at step S17, the controller 54 determines whether or not the saved counter for the just operated vehicle device is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S18.

At step S18, the controller 54 provides parameter setting information to the vehicle operator (at a time when the vehicle operator is not currently driving in traffic) using the display input/output 60 or, one of the mobile devices $M_1$ and $M_2$. The provided information provides options to the vehicle operator such that the vehicle operator can change and re-save the parameter settings for the operated vehicle device.

Next at step S19, the controller 54 determines whether or not the vehicle operator has entered a change or changes to the parameter settings for the operated vehicle device. If not, then operation returns to step S12. If yes, then at step S20 those changes are saved in memory by the controller 54 for future use and are associated with the current vehicle operator.

In other words, the generic logic presented in FIG. 9 demonstrates that the controller 54 is configured to count repetitions of usage of each of the vehicle devices used or operated by the first vehicle operator when the vehicle device is operated by the vehicle operator using parameters that differ from the previously saved parameter settings. The controller 54 determine whether the repetitions of the usage of the vehicle device by the first vehicle operator exceed a predetermined number. In response to the repetitions of the usage of the vehicle device by the first vehicle operator exceeding the predetermined number, the controller 54 automatically operates the information providing device to display the plurality of parameter settings of the vehicle device available for changing or selecting by the first vehicle operator. If the first vehicle operator enters changes or selects a specific parameter setting, the controller saves the selected or changed parameter settings in memory, replacing any previously saved parameter setting associated with the first vehicle operator.

In the depicted embodiment, the vehicle 10 can be provided all of the above described vehicle devices, including the door lock system 12, the seat positioning device 14, the object alert system 16, the interior lighting system 18, the audio system 20 and the vehicle driving mode system 22.

Alternatively, the vehicle 10 can be provided only one vehicle devices, including the door lock system 12, the seat positioning device 14, the object alert system 16, the interior lighting system 18, the audio system 20 or the vehicle driving mode system 22.

Still further, the vehicle 10 can be provided with combinations of two, three, four or five of the above described vehicle devices.

Figure 10:
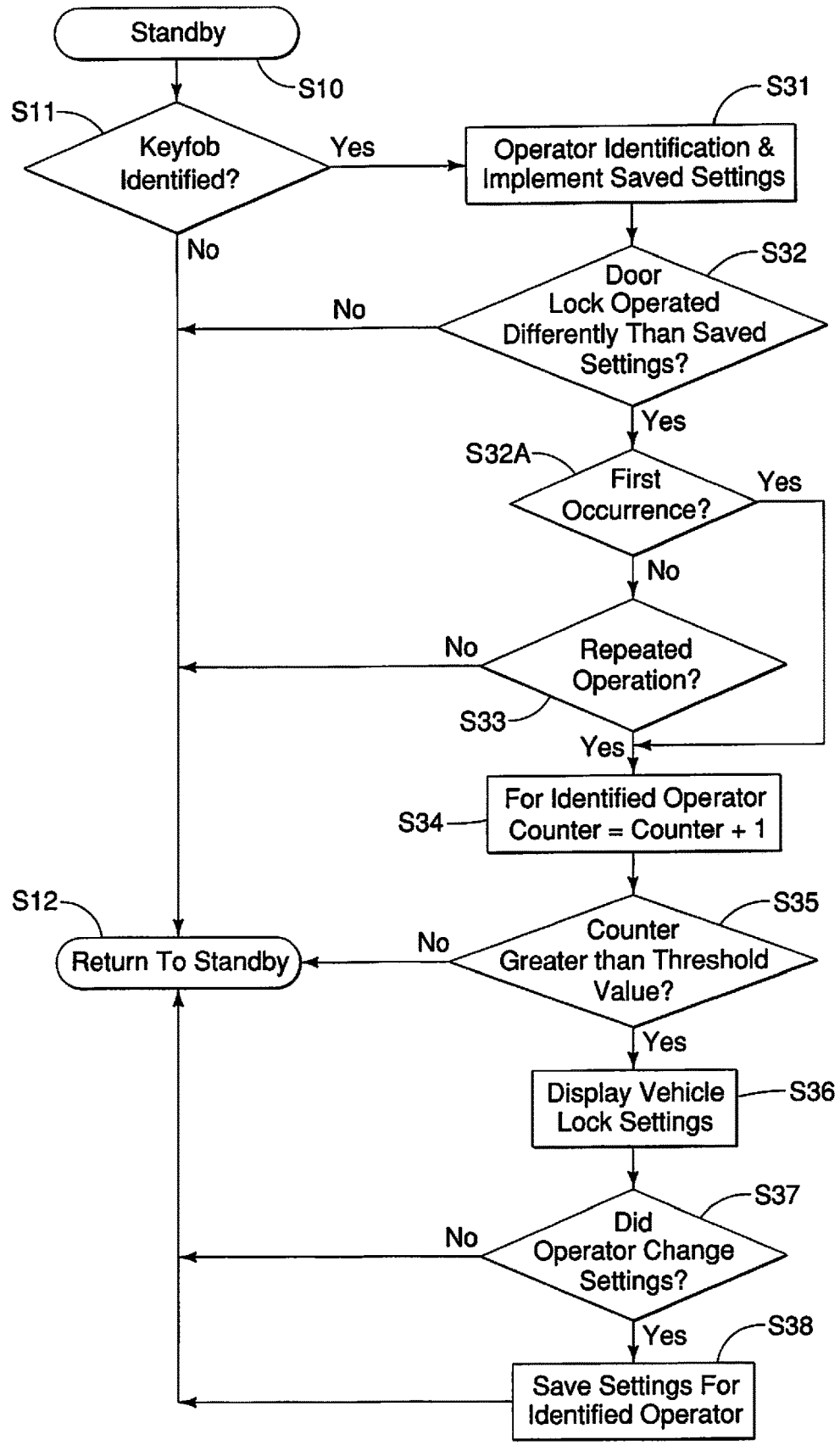
FIG. 10 is a flowchart showing basic steps conducted by the vehicle device operating parameter setting system for automatically providing a vehicle operator with information that assists the vehicle operator with the process for changing the parameter settings for the door lock system (one of the vehicle devices) and then saving the changes to the parameter settings of the door lock system for future use in accordance with the one embodiment.

With specific reference to FIG. 10, a description is now provided for operations conducted by the controller 54 during monitoring of operation of the door lock system 12 by a vehicle operator. At step S10 (the standby mode) the controller 54 monitors the various sensors of the vehicle 10 and in particular, the keyfob detectors 58. At step S11, the controller 54 determines whether or not one of the keyfobs $F_1$ and $F_2$ is close to the vehicle 10. If not, operation returns to the standby mode, as represented at step S12. If yes, operation moves to step S31. At step S31, the controller 54 identifies the vehicle operator and recalls from memory the saved parameter settings for the door lock system 12 that are associated with the identified vehicle operator.

Next at step S32, the controller 54 determines whether the vehicle operator has operated the door lock system 12 in a manner that differs from the saved parameter settings. For example, the default saved parameter setting for the door lock system 12 includes the following: a single pressing of the driver's door lock switch 32b causes the controller 54 to only unlock the driver's door 32; and a double pressing of the driver's door lock switch 32b causes the controller 54 to unlock all of the doors. At steps S32, if the controller 54 detects that the vehicle operator has pressed the driver's door lock switch 32b twice, unlocking all doors, then this operation is considered to be different than the saved parameter settings. If the vehicle operator has only pressed the driver's door lock switch 32b once, or has operated the driver's door lock switch 32b in a manner consistent with the saved parameter settings, then operation returns to step S12. At step S32, if the controller 54 determines that operation of the driver's door lock switch 32b differs from the saved parameter setting, then operation moves to step S32A.

At step S32A, the controller 54 determines whether or not this is the first deviation from the saved parameter settings. If so, then operation moves to step S34. If not, then operation moves to step S33.

Next at step S33, the controller 54 determines whether or not the differing operation identified in step S32 is a repeat. If yes, the controller 54 moves to step S34. At step S33, if no, then operation returns to step S12 (and to step S10).

At step S34, a counter for the identified operator is incremented upward by one (1). Next, at step S35, the controller 54 determines whether or not the saved counter for the door lock system 12 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S36.

At step S36, the controller 54 provides parameter setting information to the vehicle operator relating to the door lock system 12 (as long as the vehicle operator is not currently driving in traffic). The provided information provides options to the vehicle operator such that the vehicle operator can change and re-save the parameter settings for the door lock system 12. Specifically, the vehicle operator can change the settings such that a single pressing of the door lock switch 32b unlocks all of the doors. It should be understood that other parameter settings can be entered at step S36 and saved at step S38.

Next at step S37, the controller 54 determines whether or not the vehicle operator has entered a change or changes to the parameter settings for the door lock system 12. If not, then operation returns to step S12. If yes, then at step S38 those changes are saved in memory by the controller 54 for future use and are associated with the current vehicle operator.

Figure 11:
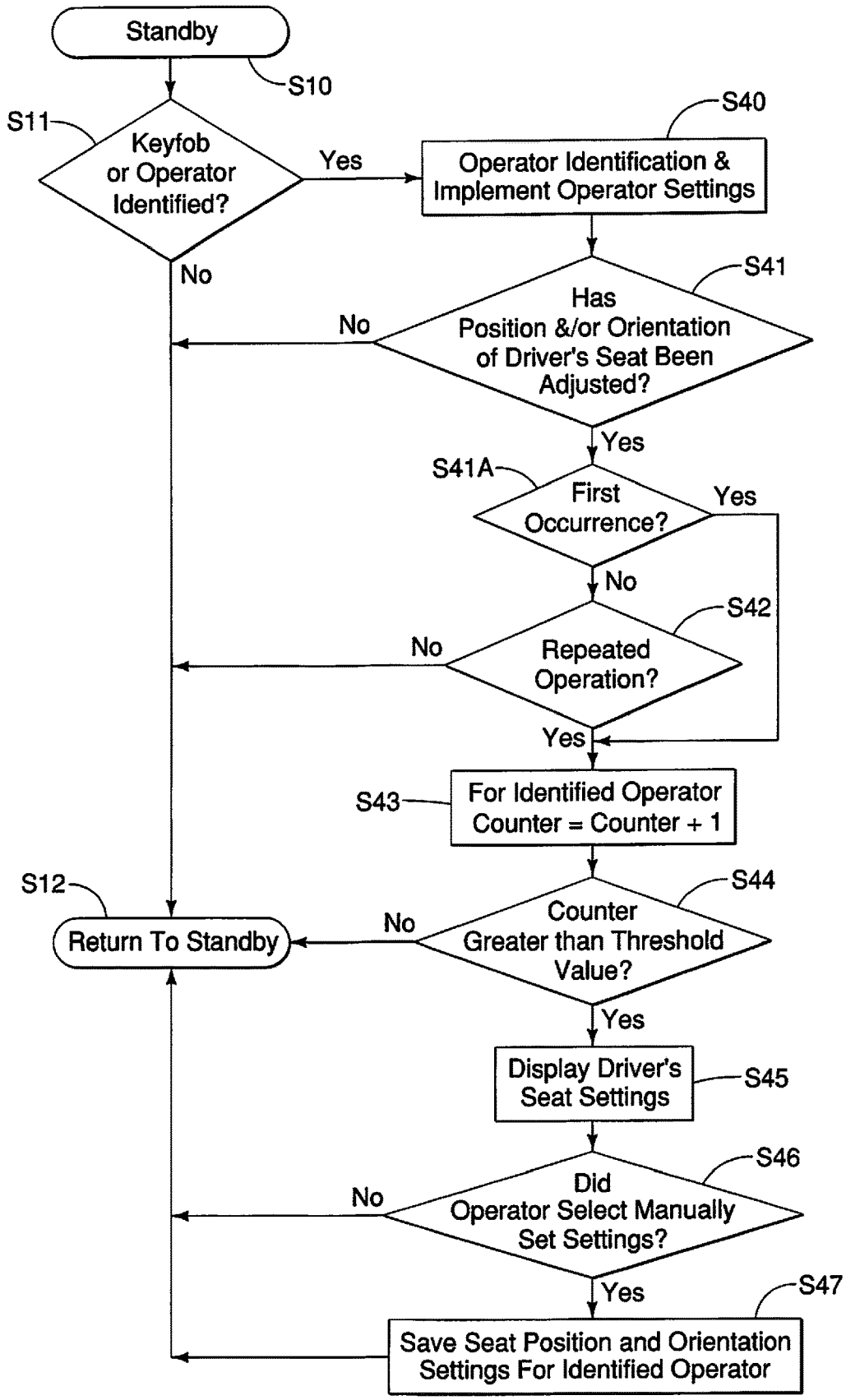
FIG. 11 is a flowchart showing basic steps conducted by the vehicle device operating parameter setting system for automatically providing a vehicle operator with information that assists the vehicle operator with the process for changing the parameter settings for the adjustable driver's seat (one of the vehicle devices) and then saving the changes to the parameter settings of the adjustable driver's seat for future use in accordance with the one embodiment.

With specific reference to FIG. 11, a description is now provided for operations conducted by the controller 54 during monitoring of operation of the seat positioning device 14 by a vehicle operator. At step S10 (the standby mode) the controller 54 monitors the various sensors of the vehicle 10 and in particular, the control panel 50 of the driver's seat 42. At step S11, the controller 54 determines whether or not one of the keyfobs $F_1$ and $F_2$ is close to the vehicle 10. If not, operation returns to the standby mode, as represented at step S12. If yes, operation moves to step S40. At step S40, the controller 54 identifies the vehicle operator and recalls from memory the saved parameter settings for the seat positioning device 14 that are associated with the identified vehicle operator.

Next at step S41, the controller 54 determines whether the vehicle operator has operated the control panel 50 of the seat positioning device 14 in order to reposition one or more sections of the driver's seat 42 in a manner that differs from the saved parameter settings (the currently saved seat positions and orientation). If the vehicle operator has not operated the control panel 50, then operations return to step S12. If the vehicle operator has operated the control panel 50 operating any one or all of the vertical motor 42a, the forward/rearward motor 42b and/or the seatback angle motor 42c, then operation moves to step S41A.

At step S41A, the controller 54 determines whether or not this is the first deviation from the saved parameter settings. If so, then operation moves to step S43. If not, then operation moves to step S42.

Next at step S42, the controller 54 determines whether or not the current iteration is a repeat of the previous operation detected at step S41. If yes, the controller 54 moves to step S43. At step S42, if no, then operation returns to step S12 (and to step S10).

At step S43 a counter for the identified vehicle operator is incremented upward by one (1). Next, at step S44, the controller 54 determines whether or not the saved counter for the seat positioning device 14 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S45.

At step S45, the controller 54 provides parameter setting information to the vehicle operator relating to the seat positioning device 14 (as long as the vehicle operator is not currently driving in traffic). The provided information provides options to the vehicle operator such that the vehicle operator can change and re-save the seat position and orientation parameter settings for the seat positioning device 14. Specifically, the vehicle operator can change the seat settings and save them as parameter settings for the identified vehicle operator.

Next at step S46, the controller 54 determines whether or not the vehicle operator has entered a change or changes to the parameter settings for the seat positioning device 14. If not, then operation returns to step S12. If yes, then at step S47 those changes are saved in memory by the controller 54 for future use and are associated with the current vehicle operator.

Figure 12:
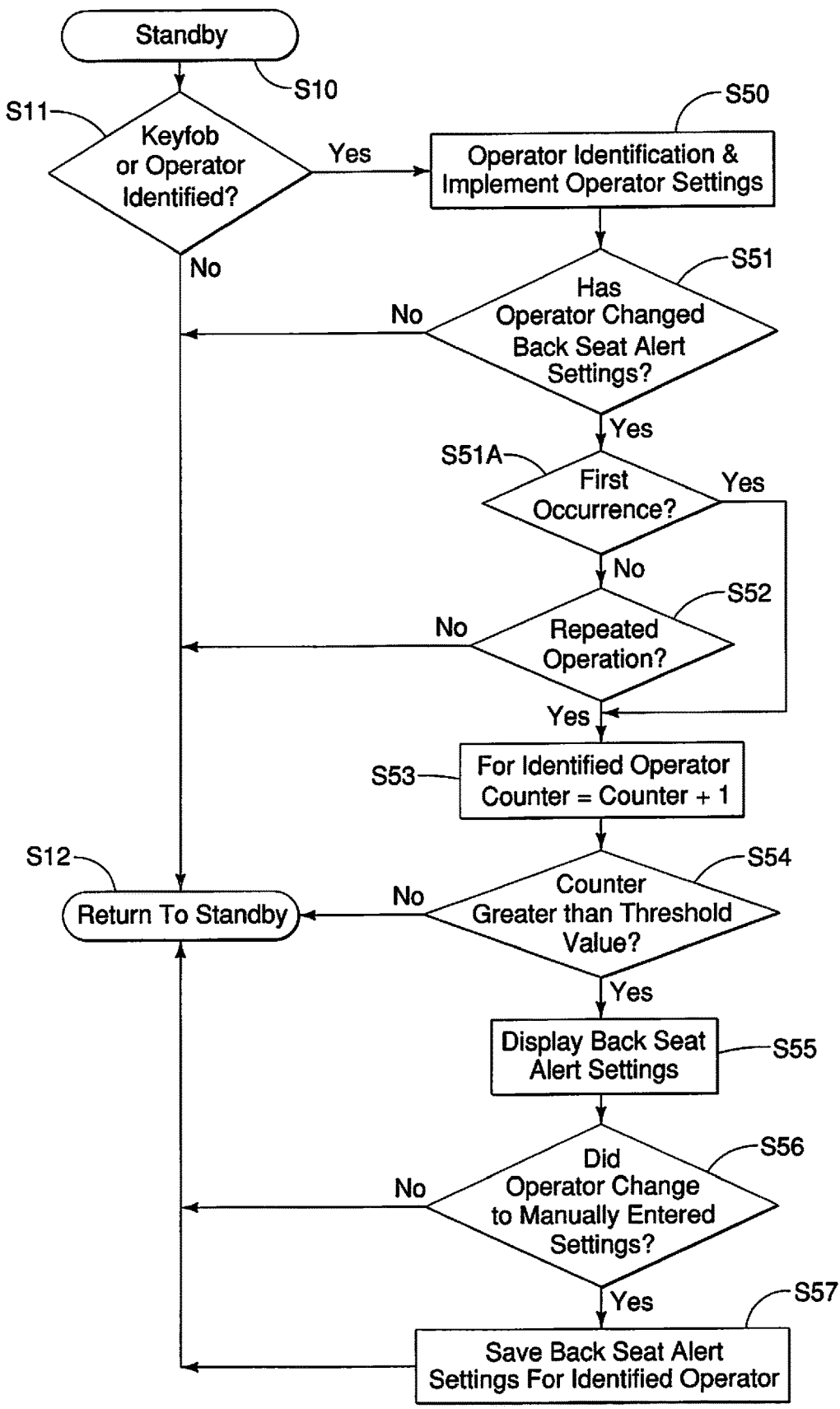
FIG. 12 is a flowchart showing basic steps conducted by the vehicle device operating parameter setting system for automatically providing a vehicle operator with information that assists the vehicle operator with the process for changing the parameter settings for the object alert system (one of the vehicle devices, also referred to as a back seat alert system) and then saving the changes to the parameter settings of the object alert system for future use in accordance with the one embodiment.

With specific reference to FIG. 12, a description is now provided for operations conducted by the controller 54 during monitoring of operation of the object alert system 16 by a vehicle operator. At step S10 (the standby mode) the controller 54 monitors the various sensors of the vehicle 10 and in particular, the display (input/output) 60 and, more specifically, controls that enable and disable the object alert system 16. At step S11, the controller 54 determines whether or not one of the keyfobs $F_1$ and $F_2$ is close to the vehicle 10. If not, operation returns to the standby mode, as represented at step S12. If yes, operation moves to step S50. At step S50, the controller 54 identifies the vehicle operator and recalls from memory the saved parameter settings for the object alert system 16 that are associated with the identified vehicle operator.

Next at step S51, the controller 54 determines whether the vehicle operator has operated the controls that enable and disable the object alert system 16. Specifically, the controller 54 determines whether or not the identified vehicle operator has changed from the saved parameter setting to a non-saved parameter setting. For example, if the saved parameter setting has the object alert system 16 being dis-abled, and the identified vehicle operator switches the object alert system 16 to enabled, or vice-versa, then there has been a change to a non-saved parameter setting. If the settings have not been changed, operation moves to step S12. If the settings have been changed, then operation moves to step S51A.

At step S51A, the controller 54 determines whether or not this is the first deviation from the saved parameter settings. If so, then operation moves to step S53. If not, then operation moves to step S52.

Next at step S52, the controller 54 determines whether or not the current iteration is a repeat of the previous operation detected at step S51. If yes, the controller 54 moves to step S53. At step S52, if no, then operation returns to step S12 (and to step S10).

At step S53 a counter for the identified vehicle operator is incremented upward by one (1). Next, at step S54, the controller 54 determines whether or not the saved counter for the object alert system 16 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S55.

At step S55, the controller 54 provides parameter setting information to the vehicle operator relating to the object alert system 16 (as long as the vehicle operator is not currently driving in traffic). The provided information provides options to the vehicle operator such that the vehicle operator can change the status of the object alert system 16 (parameter settings).

Next at step S56, the controller 54 determines whether or not the vehicle operator has entered a change or changes to the parameter settings for object alert system 16. If not, then operation returns to step S12. If yes, then at step S57 those changes are saved in memory by the controller 54 for future use and are associated with the current vehicle operator.

Figure 13:
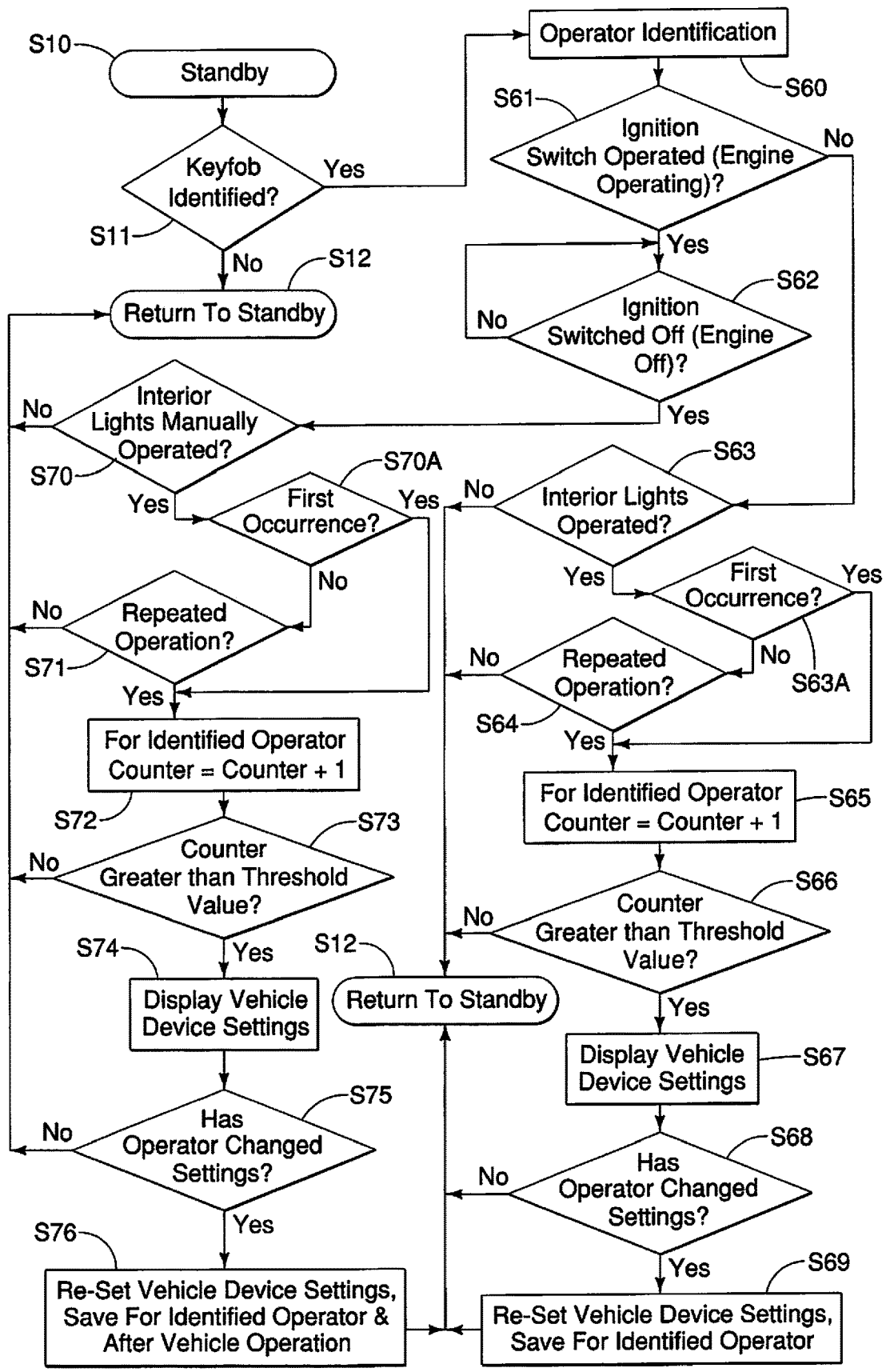
FIG. 13 is a flowchart showing basic steps conducted by the vehicle device operating parameter setting system for automatically providing a vehicle operator with information that assists the vehicle operator with the process for changing the parameter settings for the interior lighting system (one of the vehicle devices) and then saving the changes to the parameter settings of the interior lighting system for future use in accordance with the one embodiment.

With specific reference to FIG. 13, a description is now provided for operations conducted by the controller 54 during monitoring of operation of the interior lighting system 18 by a vehicle operator. At step S10 (the standby mode) the controller 54 monitors the various sensors of the vehicle 10 and in particular, the interior light switch 62 and the map light switch 64. At step S11, the controller 54 determines whether or not one of the keyfobs $F_1$ and $F_2$ is close to the vehicle 10. If not, operation returns to the standby mode, as represented at step S12. If yes, operation moves to step S60. At step S60, the controller 54 identifies the vehicle operator and recalls from memory the saved parameter settings for the object alert system 16 that are associated with the identified vehicle operator.

Next at step S61, determines whether or not the ignition switch 56 has been operated to switch the engine E from off to on. If no, then operation moves to step S63, s described further below. If yes, the operation moves to step S62.

At step S63, the controller 54 determines whether or not the vehicle operator has operated the interior lighting system 18. Specifically, the controller 54 determines whether or not the identified vehicle operator has prolonged operation of one or both of the interior lights 66 and the map light 68 prior without starting the engine E.

Typically, when a vehicle door is opened, the controller 54 automatically turns the interior lights 66 on and keeps them on for a predetermined amount of time after all of the doors of the vehicle 10 are closed. The predetermined time is, for example, 30 seconds or a minute, and one of the saved parameter settings for the interior lighting system 18. If the vehicle operator turns the interior lights on again immediately after the interior lights 66 have timed out (turned off automatically) the controller 54 detects the switching of the interior lights 66 on again as a deviation of the saved parameter settings for the interior lighting system 18. Similarly, after the engine E has been turned off after driving, the controller 54 automatically turns the interior lights 66 on and keeps them on for a predetermined amount of time, for example, 30 seconds or a minute. If the vehicle operator turns the interior lights on again immediately after the interior lights 66 have timed out (turned off automatically) the controller 54 detects the switching of the interior lights 66 on again as a deviation of the saved parameter settings for the interior lighting system 18.

Hence, at step S63, if the automatic operating of the interior lights 66 and/or the map light 68 has not been extended (operating time not extended), then operation returns to step S12. At step S63, if the automatic operating of the interior lights 66 and/or the map light 68 has been extended (operating time extended), then operation moves to step S63A.

At step S63A, the controller 54 determines whether or not this is the first deviation from the saved parameter settings. If so, then operation moves to step S65. If not, then operation moves to step S64.

Next at step S64 the controller 54 determines whether or not the current iteration is a repeat of the previous operation detected at step S63. If yes, the controller 54 moves to step S65. At step S64, if no, then operation returns to step S12 (and to step S10).

At step S65, a counter for the identified vehicle operator is incremented upward by one (1). Next, at step S66, the controller 54 determines whether or not the saved counter for the interior lighting system 18 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S67.

At step S67, the controller 54 provides parameter setting information to the vehicle operator relating to the interior lighting system 18 (as long as the vehicle operator is not currently driving in traffic). The provided information provides options to the vehicle operator such that the vehicle operator can change the length of time that the interior lights 66 and/or the map light 68 is to remain on prior to operating the engine E (parameter settings).

Next at step S68, the controller 54 determines whether or not the vehicle operator has entered a change or changes to the parameter settings for interior lighting system 18. If not, then operation returns to step S12. If yes, then at step S69 those changes are saved in memory by the controller 54 for future use and are associated with the current vehicle operator.

Returning now to step S62, if the controller determines that the ignition switch 56 has been turned off (engine E turned off after operating). If yes, operation moves to step S70.

At step S70, the controller 54 determines whether or not the vehicle operator has operated the interior lighting system 18 after operating the engine E. Specifically, the controller 54 determines whether or not the identified vehicle operator has prolonged operation of one or both of the interior lights 66 and the map light 68 prior after shutting the engine E off after driving the vehicle 10.

At step S70, if the automatic operating of the interior lights 66 and/or the map light 68 has not been extended (operating time not extended), then operation returns to step S12. At step S70, if the automatic operating of the interior lights 66 and/or the map light 68 has been extended (operating time extended) due to manual operation of one or both of the interior light switch 62 of the map light switch 64, then operation moves to step S70A.

At step S70A, the controller 54 determines whether or not this is the first deviation from the saved parameter settings. If so, then operation moves to step S72. If not, then operation moves to step S71.

Next at step S71 the controller 54 determines whether or not the current iteration is a repeat of the previous operation detected at step S70. If yes, the controller 54 moves to step S72. At step S71, if no, then operation returns to step S12 (and to step S10).

At step S72, a counter for the identified vehicle operator is incremented upward by one (1). Next, at step S73, the controller 54 determines whether or not the saved counter for the interior lighting system 18 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S74.

At step S74, the controller 54 provides parameter setting information to the vehicle operator relating to the interior lighting system 18 (as long as the vehicle operator is not currently driving in traffic). The provided information provides options to the vehicle operator such that the vehicle operator can change the length of time that the interior lights 66 and/or the map light 68 is to remain on prior to operating the engine E (parameter settings).

Next at step S75, the controller 54 determines whether or not the vehicle operator has entered a change or changes to the parameter settings for interior lighting system 18. If not, then operation returns to step S12. If yes, then at step S76 those changes are saved in memory by the controller 54 for future use and are associated with the current vehicle operator.

Figure 14:
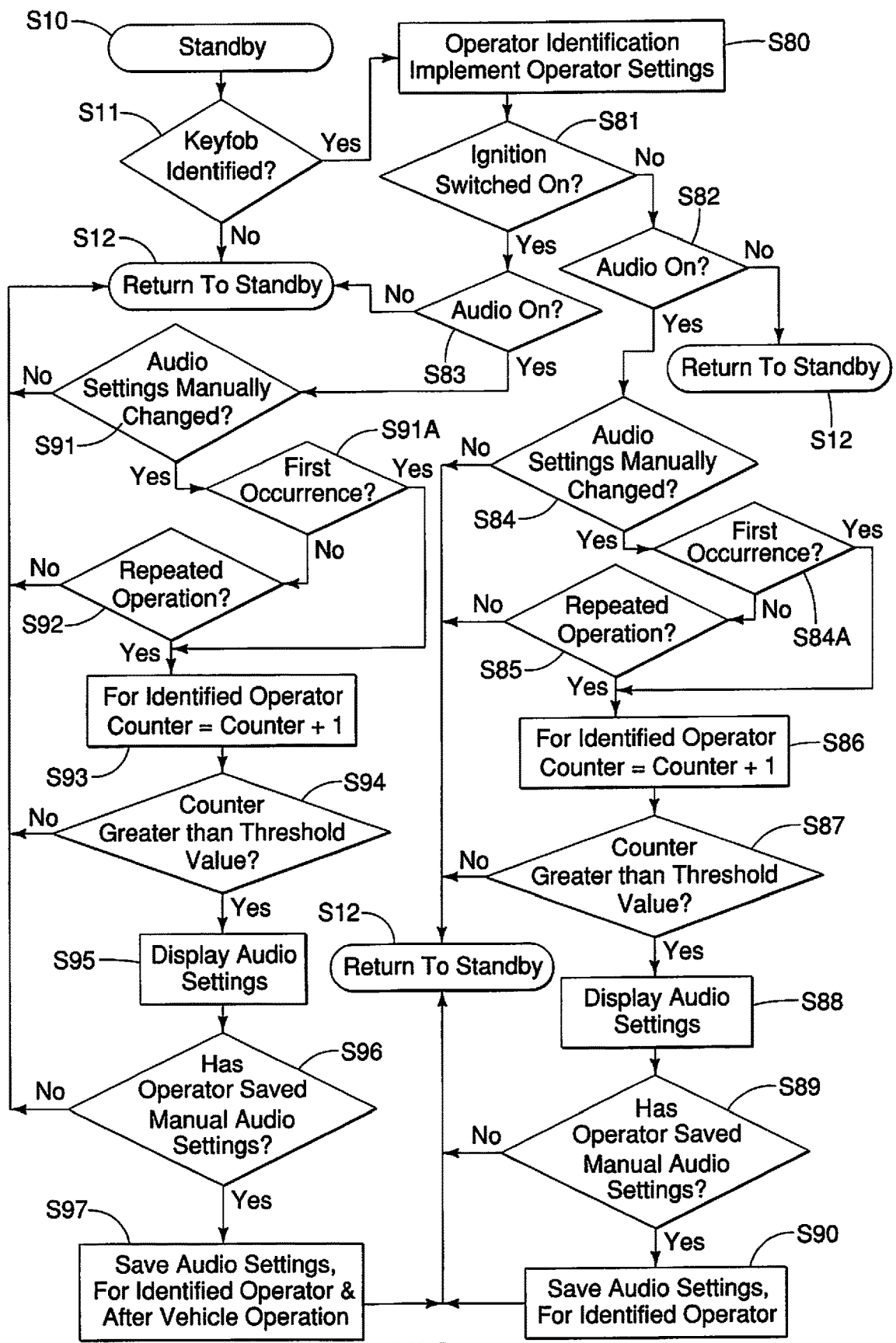
FIG. 14 is a flowchart showing basic steps conducted by the vehicle device operating parameter setting system for automatically providing a vehicle operator with information that assists the vehicle operator with the process for changing the parameter settings for the audio system (one of the vehicle devices) and then saving the changes to the parameter settings of the audio system for future use in accordance with the one embodiment.

With specific reference to FIG. 14, a description is now provided for operations conducted by the controller 54 during monitoring of operation of the audio system 20 by a vehicle operator. At step S10 (the standby mode) the controller 54 monitors the various sensors of the vehicle 10 and in particular, the controls of the audio system 20. At step S11, the controller 54 determines whether or not one of the keyfobs $F_1$ and $F_2$ is close to the vehicle 10. If not, operation returns to the standby mode, as represented at step S12. If yes, operation moves to step S80. At step S80, the controller 54 identifies the vehicle operator and recalls from memory the saved parameter settings for the audio system 20 that are associated with the identified vehicle operator.

Next at step S81, determines whether or not the ignition switch 56 has been operated to switch the engine E from off to on. If yes, then operation moves to step S83, as described further below. If no, the operation moves to step S82.

At step S82, the controller 54 determines whether or not the vehicle operator has operated the audio system 20. If the audio system 20 has been turned on, operation moves to step S84. If not, operation moves to step S12.

At step S84, the controller 54 determines whether or not settings on the audio system 20 have been changes, such as operation settings (source settings and station settings) and audio settings (volume and EQ settings). If not, operations move to step S12. If yes, then operation moves to step S84A.

At step S84A, the controller 54 determines whether or not this is the first deviation from the saved parameter settings. If so, then operation moves to step S86. If not, then operation moves to step S85.

Next at step S85 the controller 54 determines whether or not the current iteration is a repeat of the previous operation detected at step S84. If yes, the controller 54 moves to step S86. At step S64, if no, then operation returns to step S12 (and to step S10).

At step S86, a counter for the identified vehicle operator is incremented upward by one (1). Next, at step S87, the controller 54 determines whether or not the saved counter for the audio system 20 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S88.

At step S88, the controller 54 provides parameter setting information to the vehicle operator relating to the audio system 20 (as long as the vehicle operator is not currently driving in traffic). The provided information provides options to the vehicle operator such that the vehicle operator can save the current settings of the audio system 20 as manually inputted by the vehicle operator in step S84 (such as new source or station and new volume and EQ settings) and save as parameter settings for the identified vehicle operator.

Next at step S89, the controller 54 determines whether or not the vehicle operator has entered a change or changes to the parameter settings for audio system 20. If not, then operation returns to step S12. If yes, then at step S90 those changes are saved in memory by the controller 54 for future use and are associated with the current vehicle operator.

Returning now to step S81, if the controller determines that the ignition switch 56 has been turned on. If yes, operation moves to step S83.

At step S83, the controller 54 determines whether or not the vehicle operator has operated the audio system 20. If the audio system 20 has been turned on, operation moves to step S91. If not, operation moves to step S12.

At step S91, the controller 54 determines whether or not settings on the audio system 20 have been changes, such as operation settings (source settings and station settings) and audio settings (volume and EQ settings). If not, operations move to step S12. If yes, then operation moves to step S91A.

At step S91A, the controller 54 determines whether or not this is the first deviation from the saved parameter settings. If so, then operation moves to step S93. If not, then operation moves to step S92.

Next at step S92 the controller 54 determines whether or not the current iteration is a repeat of the previous operation detected at step S91. If yes, the controller 54 moves to step S93. At step S92, if no, then operation returns to step S12 (and to step S10).

At step S93, a counter for the identified vehicle operator is incremented upward by one (1). Next, at step S94, the controller 54 determines whether or not the saved counter for the audio system 20 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S95.

At step S95, the controller 54 provides parameter setting information to the vehicle operator relating to the audio system 20 (as long as the vehicle operator is not currently driving in traffic). The provided information provides options to the vehicle operator such that the vehicle operator can save the current settings of the audio system 20 as manually inputted by the vehicle operator in step S84 (such as new source or station and new volume and EQ settings) and save as parameter settings for the identified vehicle operator.

Next at step 96, the controller 54 determines whether or not the vehicle operator has entered a change or changes to the parameter settings for audio system 20. If not, then operation returns to step S12. If yes, then at step S97 those changes are saved in memory by the controller 54 for future use and are associated with the current vehicle operator.

Figure 15:
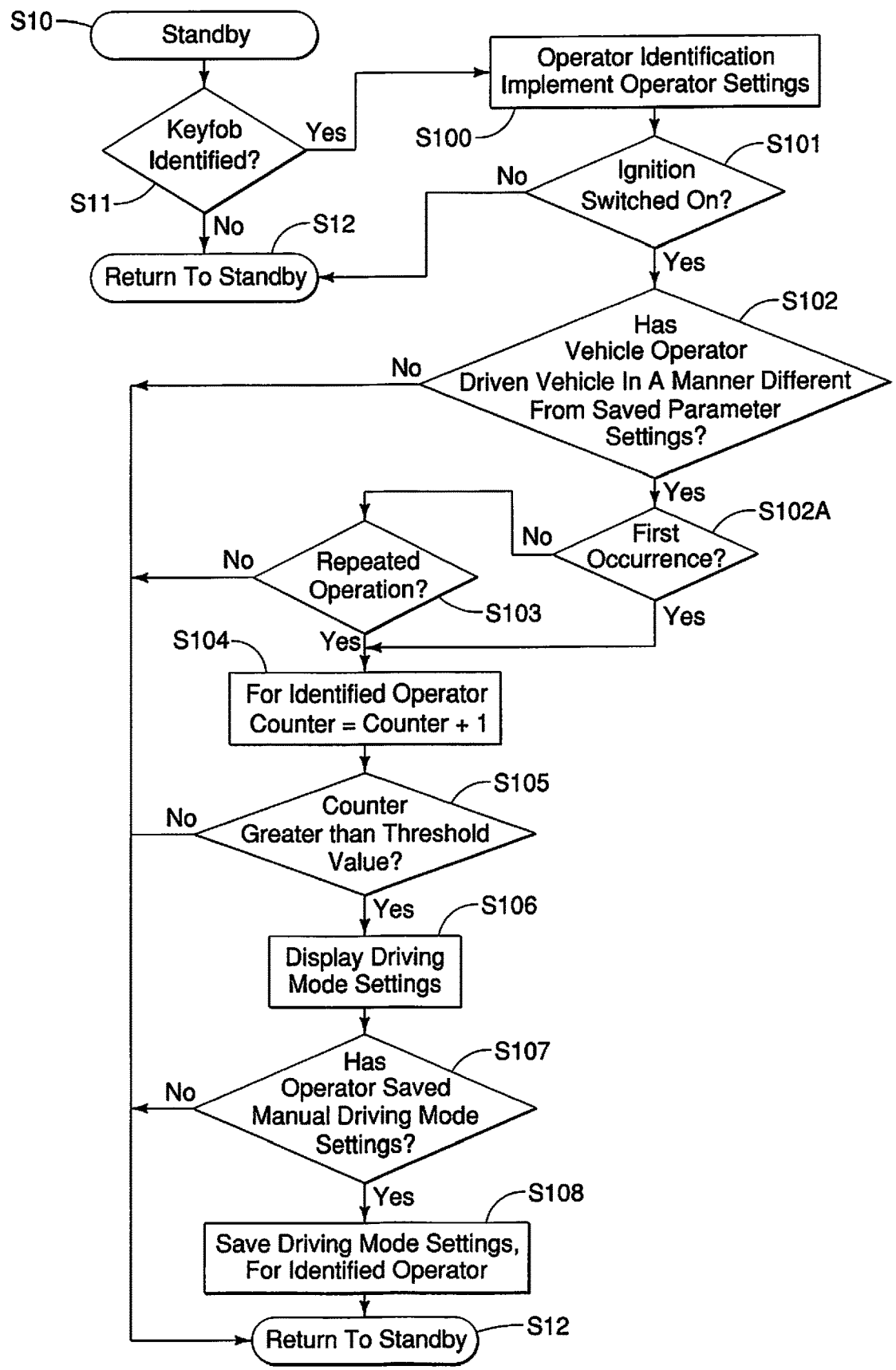
FIG. 15 is a flowchart showing basic steps conducted by the vehicle device operating parameter setting system for automatically providing a vehicle operator with information that assists the vehicle operator with the process for changing the parameter settings for the driving mode system (one of the vehicle devices) and then saving the changes to the parameter settings of the driving mode system for future use in accordance with the one embodiment.

With specific reference to FIG. 15, a description is now provided for operations conducted by the controller 54 during monitoring of operations of the vehicle 10 relating to the vehicle driving mode system 22. At step S10 (the standby mode) the controller 54 monitors the various sensors of the vehicle 10 and in particular, the sensors related to the vehicle driving mode system 22. At step S11, the controller 54 determines whether or not one of the keyfobs $F_1$ and $F_2$ is close to the vehicle 10. If not, operation returns to the standby mode, as represented at step S12. If yes, operation moves to step S100. At step S100, the controller 54 identifies the vehicle operator and recalls from memory the saved parameter settings for the vehicle driving mode system 22 that are associated with the identified vehicle operator.

Next at step S101, the controller 54 determines whether or not the ignition switch 56 has been operated to switch the engine E from off to on. If yes, then operation moves to step S102. If no, the operation moves to step S12.

At step S102, the controller 54 determines whether or not the vehicle operator has been operating the vehicle 10 in a manner that is different or inconsistent with the current mode of operation of the vehicle 10. As described above, the driving mode system 22 includes customized operations of the engine and transmission E. For example, the vehicle 10 can be operated in the economy mode (fuel efficient), the performance mode (maximum engine power available) and the normal mode (balance between the economy mode and the performance mode. Initially, the driving mode system 22 is set to the normal mode of operation.

At step S102, the controller 54 monitors the driving habits of the identified vehicle operator. For example, if the acceleration patterns and average speeds maintained by the identified vehicle operator are consistent with driving habits that are more consistent with driving in the performance mode, and the saved parameter setting is the normal mode or the economy mode, then the identified vehicle operator is operating the vehicle 10 in a manner different from or inconsistent with the saved parameter settings. Similarly, if the acceleration patterns and average speeds maintained by the identified vehicle operator are consistent with driving habits that are more consistent with driving in the economy mode, and the saved parameter setting is the performance mode, then the identified vehicle operator is operating the vehicle 10 in a manner different from or inconsistent with the saved parameter settings.

If at step S102, the driving habits of the identified vehicle operation differ from the saved parameter setting, then operation moves to step S102A At step S102A, the controller 54 determines whether or not this is the first occurrence of deviation from the saved parameter settings. If so, then operation moves to step S104. If not, then operation moves to step S103.

Next at step S103 the controller 54 determines whether or not the current iteration is a repeat of the previous operation detected at step S102. If yes, the controller 54 moves to step S104. At step S103, if no, then operation returns to step S12 (and to step S10).

At step S104, a counter for the identified vehicle operator is incremented upward by one (1). Next, at step S105, the controller 54 determines whether or not the saved counter for the vehicle driving mode system 22 is greater than a predetermined threshold value. In the depicted embodiment, the predetermined threshold can have a value of, for example, 5, or greater. If the counter is not greater than the threshold, then operation returns to step S12. If the counter is greater than the threshold and operation moves to step S106.

At step S106, the controller 54 provides parameter setting information to the vehicle operator relating to the vehicle driving mode system 22 (as long as the vehicle operator is not currently driving in traffic). The provided information provides options to the vehicle operator such that the vehicle operator can change the current mode of operation of the vehicle driving mode system 22.

Next at step S107, the controller 54 determines whether or not the vehicle operator has entered a change or changes to the parameter settings for the vehicle driving mode system 22. If not, then operation returns to step S12. If yes, then at step S108 the selected mode of operation of the vehicle driving mode system 22 is saved in memory by the controller 54 for future use and are associated with the current vehicle operator.

As mentioned above, the vehicle device operating parameter setting system can include any one of the door lock system 12, the seat positioning system 14, the object alert system 16, the interior lighting system 18, the audio system 20 and/or the vehicle driving mode system 22, and combinations thereof.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle device operating parameter setting system. Accordingly, these terms, as utilized to describe the present invention should be interpreted relative to a vehicle equipped with the the vehicle device operating parameter setting system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle device operating parameter setting system, comprising:
   a vehicle device installed to a vehicle and being operable with parameter settings of the vehicle device, the vehicle device being initially set to operate with previously saved parameter settings;
   a sensor configured to detect operation of the vehicle device by a first vehicle operator;
   an information providing device configured to provide information about the parameter settings of the vehicle device to the first vehicle operator;
   an input device configured to receive input entered by the first vehicle operator, the input device having a display; and
   a controller connected to the vehicle device, the sensor, the information providing device and the input device, the controller being configured to count repetitions of usage of the vehicle device by the first vehicle operator when the first vehicle operator changes the parameter settings while operating the vehicle device where the changes to the parameter settings differ from the previously saved parameter settings, and, the controller being further configured to determine whether the repetitions of the usage of the vehicle device using the changed parameter settings by the first vehicle operator exceed a predetermined number, and in response to the repetitions of the usage of the vehicle device by the first vehicle operator exceeding the predetermined number, the controller automatically operates the information providing device to display on the display information about the counted repetitions of usage of the vehicle device using the changes to the parameter settings, the information displayed by the display further including options to the first vehicle operator such that after displaying the counted changes in the parameter settings the first vehicle operator uses the input device to select, change and save the parameter settings of the vehicle device, thereby replacing the previously saved parameter settings.

2. The vehicle device operating parameter setting system according to claim 1, wherein
   the vehicle device is a door lock system that includes at least one electronic lock/unlock button on a driver's side door of the vehicle.

3. The vehicle device operating parameter setting system according to claim 2, wherein
   the door lock system operates with a plurality of parameter settings including a first parameter setting in which the controller unlocks only the driver's side door in response to a single pressing of the electronic lock/unlock button by the first vehicle operator, and the controller unlocking all doors of the vehicle including the driver's side door in response to a double pressing of the electronic lock/unlock button.

4. The vehicle device operating parameter setting system according to claim 3, wherein
   the plurality of parameter settings includes a second parameter setting in which the controller unlocks only the driver's side door in response to a double pressing of the electronic lock/unlock button by the first vehicle operator, and the controller unlocking all doors of the vehicle including the driver's side door in response to a single pressing of the electronic lock/unlock button.

5. The vehicle device operating parameter setting system according to claim 1, wherein
the controller is configured to save the changed parameter settings replacing the previously saved parameter setting and associating the saved parameter settings with the first vehicle operator.

6. The vehicle device operating parameter setting system according to claim 1, wherein
the controller is configured to save second changed parameter settings selected by a second vehicle operator using the input device replacing previously saved parameter settings associated with the second vehicle operator and associating the second changed parameter settings with the second vehicle operator while retaining the changed parameter settings associated with the first vehicle operator.

7. The vehicle device operating parameter setting system according to claim 1, further comprising
a keyfob detection system including at least one keyfob;
the controller is connected to the keyfob detection system and is further configured to identify the first vehicle operator based upon identification of the at least one keyfob.

8. The vehicle device operating parameter setting system according to claim 1, wherein
the vehicle device is a driver's seat that includes a positioning mechanism within the vehicle.

9. The vehicle device operating parameter setting system according to claim 8, wherein
the driver's seat operates with a plurality of parameter settings that include a first parameter setting in which the positioning mechanism automatically moves the driver's seat to a first position in response to the controller identifying the presence of the first vehicle operator.

10. The vehicle device operating parameter setting system according to claim 9, wherein
the plurality of parameter settings includes a second parameter setting in which the positioning mechanism automatically moves the driver's seat to a second position in response to the controller identifying the presence of a second vehicle operator.

11. The vehicle device operating parameter setting system according to claim 1, wherein
the vehicle device is a rear cargo alert system that implements an alerting procedure in response to detection of the presence of an object left in a cargo area of the vehicle, and
the parameter settings of the rear cargo alert system includes a first parameter setting in which the rear cargo alert system is operating and a second parameter setting in which the rear cargo alert system is not operating.

12. The vehicle device operating parameter setting system according to claim 1, wherein
the vehicle device is an interior lighting system that illuminates an interior of the vehicle, and
the parameter settings of the interior lighting system includes a first parameter setting in which the interior lighting system illuminates the interior of the vehicle for a first predetermined period of time in response to a vehicle engine being shut off, and a second parameter setting in which the interior lighting system illuminates the interior of the vehicle for a second predetermined period of time longer than the first predetermined period of time in response to a vehicle engine being shut off.

13. The vehicle device operating parameter setting system according to claim 1, wherein
the vehicle device is an audio system within the vehicle, and
the parameter settings of the audio system includes a first parameter setting in which the audio system broadcasts a first audio source at first volume and EQ settings, and a second parameter setting in which the audio system broadcasts a second audio source at second volume and EQ settings.

14. The vehicle device operating parameter setting system according to claim 1, wherein
the vehicle device is a driving mode system within the vehicle, and
the parameter settings of the driving mode system includes a first driving mode in which engine and transmission of the vehicle are operated in a fuel economy mode, and a second parameter setting in which in which engine and transmission of the vehicle are operated in a performance mode.

15. A method of re-setting operating parameters of vehicle device, comprising:
providing a vehicle with a vehicle device that is operable in any one of a plurality of parameter settings, the vehicle device being initially set to operate with a previously saved parameter setting of the plurality of parameter settings,
detecting operation of the vehicle device by a first vehicle operator;
providing an input/output device configured to provide the first vehicle operator with information about the plurality of parameter settings and the previously saved parameter setting, the input/output device being further configured to receive selections and changes to the previously saved parameter setting inputted by the first vehicle operator,
counting repetitions of usage of the vehicle device by the first vehicle operator with the first vehicle operator using parameters that differ from the previously saved parameter setting,
determining whether the counted repetitions of the usage of the vehicle device by the first vehicle operator using parameters that differ from the previously saved parameter setting exceed a predetermined number, and in response to the counted repetitions exceeding the predetermined number, automatically operating the input/output device to display the parameters that differ from the previously saved parameter setting along with the previously saved parameter setting and the plurality of vehicle parameter settings for the first vehicle operator, and
saving the parameters that differ from the previously saved parameter setting thereby replacing the previously saved parameter setting in response to the first vehicle operator using the input/output device to select the parameters that differ from the previously saved vehicle parameter setting.

16. The method of re-setting operating parameters of vehicle device according to claim 15, wherein
the providing the vehicle with a vehicle device includes the vehicle device being a door lock system that includes at least one electronic lock/unlock button on a driver's side door of the vehicle.

17. The method of re-setting operating parameters of vehicle device according to claim 15, wherein
the providing the vehicle with a vehicle device includes the vehicle device being a driver's seat that includes a positioning mechanism within the vehicle.

18. The method of re-setting operating parameters of vehicle device according to claim 15, wherein
the providing the vehicle with a vehicle device includes the vehicle device being one of an interior lighting system that illuminates an interior of the vehicle and an audio system within the vehicle.

19. The method of re-setting operating parameters of vehicle device according to claim 16, wherein
the providing the vehicle with a vehicle device includes the vehicle device being a driving mode system within the vehicle.

20. The method of re-setting operating parameters of vehicle device according to claim 15, wherein
the providing the vehicle with a vehicle device includes the vehicle device being an audio system within the vehicle.

\* \* \* \* \*